United States Patent [19]

Burger et al.

[11] 3,753,707

[45] Aug. 21, 1973

[54] METHOD OF CONTROLLING EXPOSURE DURING PHOTOGRAPHIC PRINTING OF VARIABLE CONTRAST MATERIAL

[75] Inventors: Theodor Burger, Munich; Erhard Hellmig, Leverkusen, both of Germany; Jacques Leon Vanheerentals, Schoten, Belgium

[73] Assignee: Agfa-Gevaert Aktiengesellschaft, Leverkusen, Germany

[22] Filed: Aug. 13, 1971

[21] Appl. No.: 171,764

Related U.S. Application Data

[63] Continuation of Ser. No. 714,187, March 19, 1968, abandoned.

[30] Foreign Application Priority Data

Apr. 26, 1967 Germany........................... A 55553

[52] U.S. Cl........................... 96/27, 355/83, 355/88

[51] Int. Cl............................................. G03c 5/04

[58] Field of Search .................... 96/27; 355/70, 71, 355/83, 88

[56] References Cited

UNITED STATES PATENTS 2,306,666 12/1942 Simmon ............................. 355/70

*Primary Examiner*—George F. Lesmes
*Assistant Examiner*—M. B. Wittenberg
*Attorney*—Michael S. Striker

[57] ABSTRACT

Variable contrast printing paper is exposed to light passing through a negative in two extreme colors for a total exposure time which is selected as a function of the maximum or minimum density of the negative by talking into consideration the sensitivity of printing paper. The ratio of exposures to light in the two extreme colors within the total exposure time is selected as a function of the density range, maximum density or minimum density of the negative by way of a calibration curve which is determined for the particular charge of printing material.

8 Claims, 8 Drawing Figures

*INVENTORS*
THEODOR BURGER
ERHARD HELLMIG
JACQUES LEON VANHEERENTALS

*BY*
Michael S. Striker
Attorney

INVENTORS
THEODOR BURGER
ERHARD HELLMIG
JACQUES LEON VANHEERENTALS

BY Michael S. Striker
Attorney

INVENTOR.

THEODOR BURGER
ERHARD HELLMIG
JACQUES LEON VANHEERENTALS

BY
Michael S. Striker
Attorney

INVENTORS

THEODOR BURGER
ERHARD HELLMIG
JACQUES LEON VANHEERENTALS

BY

Michael S. Striker
Attorney

INVENTORS
THEODOR BURGER
ERHARD HELLMIG
JACQUES LEON VANHEERENTALS

BY
Michael S Striker
Attorney

METHOD OF CONTROLLING EXPOSURE DURING PHOTOGRAPHIC PRINTING OF VARIABLE CONTRAST MATERIAL

This application is a continuation of Ser. No. 714,187, filed Mar. 19, 1968, and now abandoned.

BACKGROUND OF THE INVENTION

The present invention relates to a method of controlling exposure during the photographic printing of variable contrast photofinishing material which is exposed to light passing through a negative in two different colors.

In the graphic arts, particularly in the production of intaglio printing forms by photographic means, the contrast of prints must vary within an accurately determined range. In accordance with presently prevailing practice, negatives are photographed and the exposure time is selected as a function of the maximum or minimum density of such negatives. The resulting prints are developed by regulating the duration of processing and the temperature and/or concentration of developing agent in such a way that the developed print exhibits the desired range of densities. Such processes are complicated; also, they consume too much time and must be carried out by highly skilled technicians. Furthermore, the number of exposures which turn out badly is very high. Still further, the just described processes cannot be carried out by resorting to continuous developing machines of the type known in X-ray technology wherein the conditions during processing remain unchanged.

It is also known to make prints from amateur photographs by exposing photographic paper to light in two different colors to obtain a desired gradation. The apparatus which are used for making such prints comprise a fully automatic scanning unit which determines the maximum and minimum opacities of a negative. A computer calculates the exposure time on the basis of the thus determined density values. The prints are made on variable contrast (gamma) paper which is exposed to yellow and blue light. A serious drawback of presently known exposure control apparatus for variable contrast paper is that it is extremely difficult to change the ratio of blue light to yellow light for different charges of printing material and for different gamma values so as to insure satisfactory prints for all intermediate values. The relationship between the gamma values for both extreme colors is not linear and no mathematical formula has been devised to date to reproduce such relationship with a desired degree of accuracy. Therefore, the above-outlined conventional exposure control apparatus failed to gain widespread acceptance in the industry.

It is also known to employ a photographic timing device which can be adjusted to set the exposure time and the desired gradation of printing material in the conventional contrast grades "extra hard", "hard", etc. Such timing device does not establish a fixed relationship between the two extreme colors and the resulting gamma of printing paper. Accurate determination of gamma in accordance with the density range of the negative is not possible; therefore, such devices cannot be used in reproduction of negatives for graphic arts.

SUMMARY OF THE INVENTION

It is an object of the invention to provide a simple method according to which the gradation of variable contrast printing material may be controlled in such a way that the material will furnish prints with a standardized density range from a series of negatives whose density range is different while the developing treatment remains unchanged.

Another object of the invention is to provide a novel method of making prints on variable contrast printing material by exposing such material to light in two extreme colors.

The method comprises the steps of determining the total exposure time as a function of the maximum or minimum density of the negative by taking into consideration the sensitivity of variable contrast printing material, and selecting the ratio of exposures to light in the two colors within the total exposure time as a function of the maximum density, minimum density or density range of the negative by way of a calibration curve determined for the particular charge of printing material.

The calibration curve furnishes the relationship between the (negative) density range of the negative and the ratio of exposures to light in the two colors. This is necessary in order to obtain a desired (positive) density range in the print. In accordance with the present invention, the calibration curve is determined from a plurality of darkening curves which are obtained by exposures with a grey wedge with stepped color ratios. A densitometer is employed to analyze the test strips which are obtained from exposures with the wedge and to determine the density range of the wedge which is necessary to obtain a standardized density of the print for the particular ratio of colors. The calibration curve is interpolated on the basis of points each of which corresponds to one of several exposures with the wedge.

Based on the determination of maximum and minimum densities of the negative, the novel method renders it possible to accurately determine the duration of exposures to light in the two colors in such a way that, by constantly developing the exposed print in accordance with the developing of exposures made with the wedge to obtain the calibration curve, one obtains a print whose standardized density scale is within a predetermined range.

The novel features which are considered as characteristic of the invention are set forth in particular in the appended claims. The improved method itself, however, will be best understood upon perusal of the following detailed description of certain specific embodiments of an exposure control apparatus with reference to the accompanying drawing.

DESCRIPTION OF THE PREFERRED EMBODIMENTS

Figure 1:
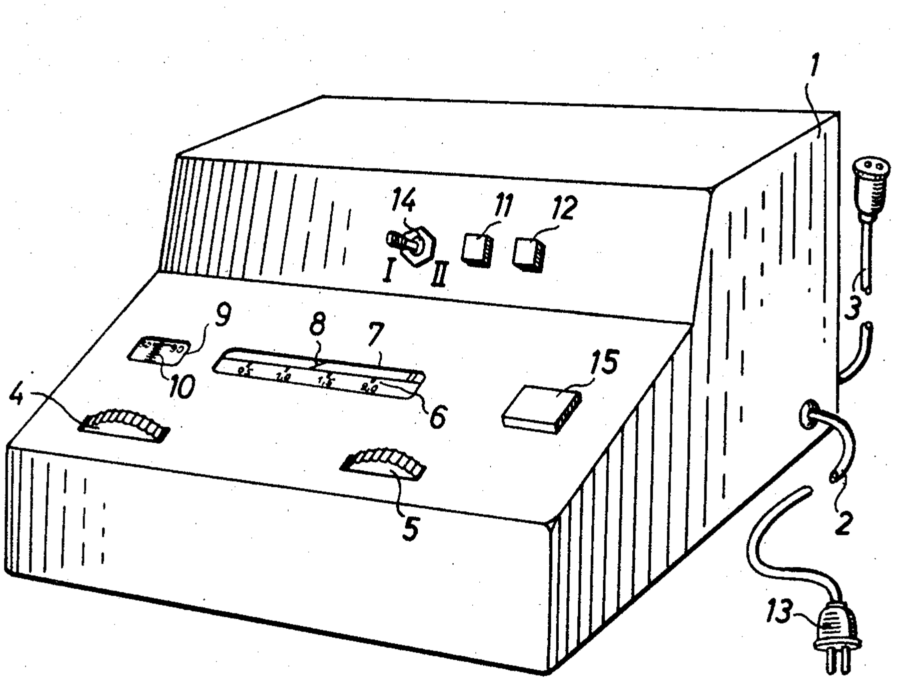
FIG. 1 is a perspective view of a portion of an exposure control apparatus which may be utilized in the practice of our method.

FIG. 1 illustrates the housing 1 of an exposure control apparatus. This housing does not contain a densitometer which is employed to determine the maximum and minimum densities of a negative, either by the light reflection or by the light penetration method. The densitometer may be of the type which is manipulated by a technician to measure the density of lightest and darkest portions of a negative which are spotted by visual observation of the negative or a fully automatic densitometer which not only detects but also records the densities of negatives.

The printing, copying or enlarging machine is also not shown in FIG. 1. Such machine may be a conventional contact-type printer or a conventional projection type photographic printer. The parts in the housing 1 of FIG. 1 determine the time of exposures in two different colors, namely, the total exposure time and the ratio of exposure times in two extreme colors. The transition from exposure in one color to exposure in the other color can be controlled directly by the exposure control apparatus. However, and particularly when the exposure times are long, the apparatus of FIG. 1 may be used to furnish indications of the required exposure times, and the operator thereupon sets the exposure times in the printer or changes the filters in accordance with such indications. The exposure control apparatus of FIG. 1 can be used in connection with conventional densitometers and printers.

Figures 2, 3:
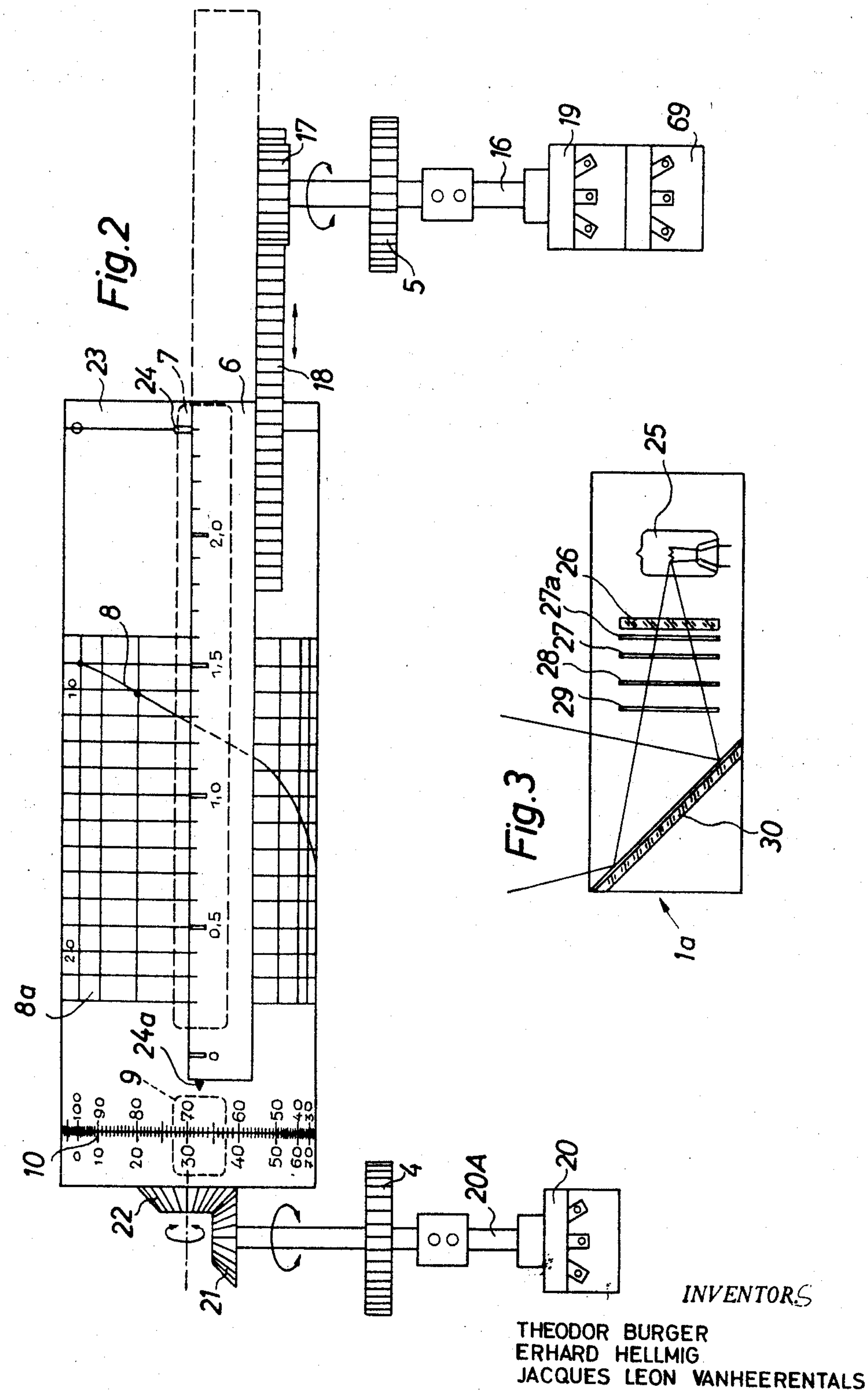
FIG. 2 is an enlarged view of certain parts in the apparatus of FIG. 1.
FIG. 3 is a schematic partly sectional view of a lamp housing which can be controlled by the apparatus of FIG. 1.

The housing 1 resembles a control stand and is provided with a cable 2 and plug 13 for connection to an outlet or another suitable source of electrical energy. A second cable 3 can be connected to a lamp housing or projector 1*a* which is shown in FIG. 3. This lamp housing 1*a* accommodates electromagnets (not shown) which control a shutter 27 or analogous light blocking means and the color filter changing mechanism. The lamp housing 1*a* can be built into a printer or it may constitute an attachment which must be connected to or installed in existing printers. In the latter instance, the light source 25 in the lamp housing 1*a* is preferably controlled by the exposure control apparatus.

The front portion of the housing 1 accommodates two adjusting knobs 4, 5 one of which can be manipulated by hand to select the positions of certain parts in dependency on the minimum density of the negative or picture carrier and the other of which can be manipulated to select the position of certain other parts in dependency on the maximum density of the negative. A density scale 6 is movable in the housing 1 behind a window 7. This window 7 further exposes a portion of a calibration curve 8. A second window 9 located to the left of the window 7 exposes a second scale 10. The housing 1 further carries two pilot lamps 11, 12 each of which lights up during exposure in one of the two colors, a switch 14 having a portion movable between the positions I and II, and a starter button 15.

The details of mechanical parts in the interior of the housing 1 are shown in FIG. 2. The adjusting knob 5 is fixed to a shaft 16 which carries a gear 17 meshing with a toothed rack 18 secured to the density scale 6. The rack 18 can move the scale 6 back and forth in the longitudinal direction of the window 7. The shaft 16 further carries the contact arms of two potentiometers 19, 69. The adjusting knob 4 is secured to a shaft 20A which carries a bevel gear 21 meshing with a bevel gear 22 secured to a rotary carrier drum 23. The drum 23 is rotatable about an axis which is parallel to the window 7 and rack 18. This drum carries the scale 10 at its left-hand end, and it also carries a sheet 8*a* with the calibration curve 8. The manner in which the sheet 8*a* is releasably secured to the periphery of the drum 23 forms no part of our invention. The sheet 8*a* may be provided with an imprinted system of coordinates to facilitate reading of the curve 8. The shaft 20A also carries the contact arm of a further potentiometer 20. A fixed index or pointer 24 is provided on the housing 1 adjacent to the right-hand end of the drum 23, and this index can register with selected graduations of the density scale 6 in response to rotation of the knob 5. A second index 24*a* is provided on the housing 1 to pinpoint a selected graduation on the scale 10.

The lamp housing 1*a* of FIG. 3 accommodates a printing lamp or an analogous light source 25 of known construction. It is desirable to select a lamp whose output is high in the range of the two colors to which the variable contrast paper is exposed during printing. Light issuing from the lamp 25 passes through a heat filter 26 and impinges against the shutter 27. A filter disk 27*a* is located between the heat filter 26 and shutter 27; this filter disk 27*a* may comprise two layers in order to place the one or the other of two grey filters into the path of light. The purpose of such grey filters will be described later. A yellow filter 28 and a flue filter 29 are installed behind the shutter 27. These filters can be replaced by filters of other colors as long as the gamma values of variable contrast paper in the particular colors are widely different. For example, the yellow filter 28 could be replaced by a red filter. Suitable electromagnetic or analogous moving means can be employed to move the shutter 27, filter disk 27*a* and filters 28, 29 into and from the path of light issuing from the source 25. A mirror 30 is located behind the blue filter 29 to deflect the light by 90° ontothe negative or into a copying frame in order to insure homogeneous illumination of the picture carrier.

Figure 4:
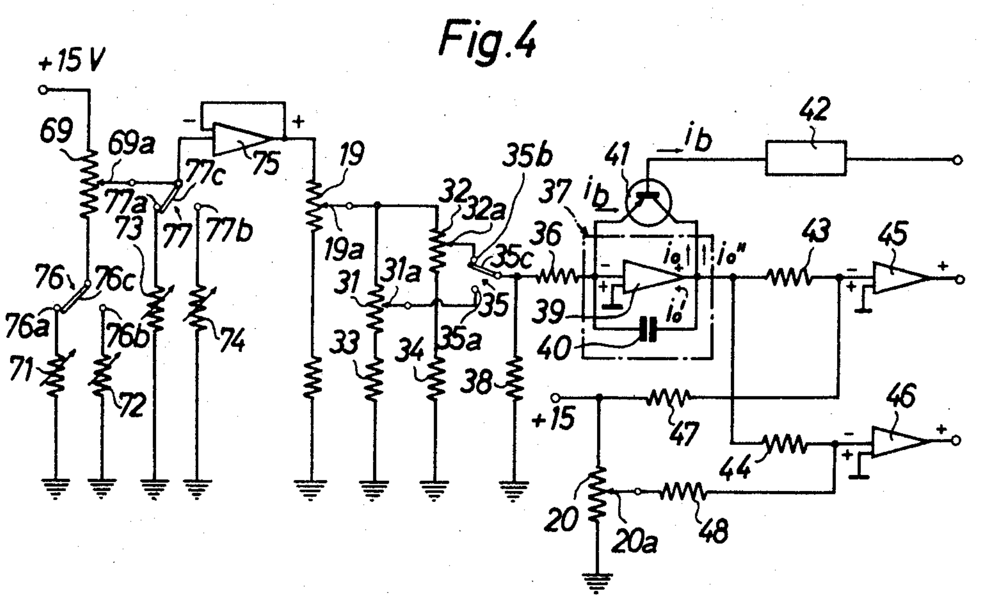
FIG. 4 is a diagram of the electric circuit for the apparatus shown in FIG. 1.

FIG. 4 illustrates the electric circuit of the exposure control apparatus. One end of the winding of potentiometer 69 is connected with a source of reference voltage (+15 volts) and the other end of this winding is connected to the movable central contact 76*c* of a two-way electric switch 76. The fixed contacts 76*a*, 76*b* of the switch 76 are connected with the ground by way of variable resistors 71, 72. These resistors form with the potentiometer 69 a voltage divider for reference potential. The selected voltage is taken off by the contact arm 69*a* which is connected to the input of a buffer amplifier 75 and with the movable central contact 77*c* of a second two-way electric switch 77. The fixed contacts 77*a*, 77*b* of the switch 77 are connected with the ground by way of variable resistors 73, 74. The parts 69, 71, 72, 73 and 74 constitute the elements of a corrective circuit for the Schwarzschild effects of variable contrast printing paper.

The output potentiometer 19 is mechanically coupled with the potentiometer 69 as shown in FIG. 2. The contact arm 19*a* of the potentiometer 19 is connected with the windings of two additional potentiometers 31, 32 which constitute a voltage divider and which are connected with the ground by way of two resistors 33, 34. The contact arms $31a$, $32a$ of potentiometers 31, 32 are connected with the fixed contacts $35a$, $35b$ of a third two-way electric switch 35 whose movable central contact $35c$ is connected with the input of an operational amplifier 37 by way of a fixed resistor 36. A further resistor 38 is connected to the ground and to a junction between the movable contact $35c$ and resistor 36.

The operational amplifier 37 serves to produce a voltage as a function of time, namely, a negative potential which increases from zero potential at the start of exposure. This amplifier 37 comprises an amplifier 39 of the type known from the art of analog computers and connected with a feedback element 40. The operational amplifier 37 produces a voltage of the feedback element 40 as a function of time. The plates of the feedback element 40 are connected to the emitter-collector circuit of a switching transistor 41 which discharges the feedback element 40 sufficiently in response to a signal from a conventional control unit 42 prior to start of an exposure. The transistor 41 is preferably of the silicon junction alloy type. When the transistor switch is closed, only the saturation voltage across the emitter-collector circuit remains.

The operation of the circuit shown in FIG. 4 is as follows.

When the circuit for control current $i_b$ is completed, the transistor 41 is conductive and the feedback element 40 discharges (current $i_o$). The transistor 41 is assisted by the action of the amplifier 39 because the control current $i_b$ flows to the input ($i_o$). When the charge of the feedback element 40 is led away, the polarity of voltage is reversed. Thus, an inverse operation of the transistor 41 take place because $i_b$ is taken over by $i_o$. The base current ceases to flow to the input so that there exists only a saturation voltage of the inversely operating transistor between the inlet and outlet of the amplifier 39. It can be readily proven that such saturation voltage is in the order of a few millivolts.

The output of the operational amplifier 37 is connected with two current comparing or evaluating devices 45, 46 by way of resistors 43, 44. These devices compare the currents flowing from the operational amplifier 37 with reference currents flowing through resistors 47, 48. The reference current for the device 45 is obtained from a source of reference voltage (in the present instance +15 volts) and resistor 47. The reference curret for the device 46 is obtained from the potentiometer 20 (which constitutes a voltage divider) and resistor 48 which is connected with the contact arm $20a$.

The device 45 may be connected with an electromagnet which serves to move the blue filter 29 of FIG. 3 into and from the path of light issuing from the lamp 25. The device 46 can be connected with an electromagnet for moving the yellow filter 28.

An OR-gate is connected with the current comparing devices 45, 46 to control an electromagnet which moves the shutter 27 from the closed or light blocking position shown in FIG. 3. The control unit 42 may comprise an arrangement which moves the shutter 27 to closed position during exchange of filters 28, 29 in order to prevent unfiltered light from reaching the negative and printing paper if the exchange of filters requires a relatively long interval of time.

The exposure control apparatus of FIGS. 1 to 4 operates as follows.

The housing 1 is connected with a source of electrical energy by way of cable 2 and plug 13 and with the lamp housing $1a$ of FIG. 3 by way of cable 3. The contact arms of potentiometers 31, 32 must be moved to positions in which the voltage at the input of the operational amplifier 37 reaches such a value that the rise in voltage at the output of the amplifier 37 as a function of time corresponds to the darkening effect of printing light upon the variable contrast printing paper. It is advisable to employ two potentiometers (31, 32) because the sensitivity of printing paper (i.e., darkening of paper per unit of time as a function of intensity of illumination) is normally not the same for both extreme colors and different charges of printing paper. For example, the potentiometer 31 can be used for calibration of exposure in blue light and the potentiometer 32 for calibration of exposure in yellow light. Since the just mentioned calibrations are carried out in the printer, it is preferred to carry out such calibrations by simultaneous consideration of the influence of light intensity in the respective color upon the paper. The resistor 38 serves to bring about some linearization of adjustment by potentiometers 31 and 32.

In addition to just mentioned calibration for sensitivity, the operator must attach to the drum 23 a sheet $8a$ with a calibration curve 8 whose configuration depends on the gradation of printing paper. The manner of plotting the curve 8 will be described in connection with FIGS. 6 and 7.

The variable resistors 71, 73 resp. 72, 74 are adjusted to compensate for Schwarzschild effects of printing paper in the two colors. If the two groups of variable resistors 71, 73 and 72, 74 are replaced by fixed resistors, the two-way switches 76, 77 can be dispensed with. Such modification of the circuit shown in FIG. 4 can be carried out if the Schwarzschild exponents for the two colors are the same. In such instances, the Schwarzschild exponents can be accounted for by altering the density scale 6, for example, by pasting a different scale over the scale 6 of FIGS. 1 and 2.

The maximum and minimum opacities of a negative are determined with a densitometer in a manner as described above. The desired maximum and minimum opacities or densities of the print are known in advance. The operator then manipulates the adjusting knob 5 to shift the density scale 6 and to simultaneously adjust the potentiometers 19 and 69 so that the index 24 on the housing 1 registers with that graduation of scale 6 which corresponds to previously determined maximum density or opacity of the negative. The potentiometer 19 has an antilog characteristic curve and selects for the calibrating potentiometers 31, 32 a voltage which is indicative of the required overall exposure time by considering the sensitivity and Schwarzschild exponents of printing paper for the individual colors. Thus, the knob 5 can select the total exposure time.

In the next step, the operator turns the adjusting knob 4 to select the ratio of exposure times in yellow and blue light. The knob 4 is turned until the intersection between the calibration curve 8 and density scale 6 pinpoints that graduation of scale 6 which indicates the determined minimum density or opacity of the negative. The scale 10 then furnishes a reading which indicates the ratio between exposures to yellow and blue light.

It is clear that the mechanism shown in FIG. 2 can be modified so that the index 24 pinpoints the graduation corresponding to minimum density and that the curve 8 pinpoints the graduation corresponding to maximum density value of the negative.

The knob 4 also adjusts the potentiometer 20 by moving the contact arm 20*a* to a position corresponding to a value of between ground potential and +15 volts. When the position of contact arm 20*a* corresponds to a potential of +15 volts, the current comparing device 46 responds almost simultaneously with but always slightly ahead of the current comparing device 45. The latter terminates the exposure. The exposure to blue light (filter 29) precedes the exposure to yellow light (filter 28) such exposure to blue light then takes up almost the entire interval which is alloted for the exposure by appropriate setting of the knob 5. If the contact arm 20*a* is closer to a position which is indicative of ground potential (zero point of current), the exposure to yellow light takes up the major part of total exposure time, i.e., the zero point of current at the input of the device 46 is reached much sooner. When the device 46 responds, i.e., when the blue filter 29 is replaced with yellow filter 28, a suitable relay (not shown) actuates the switches 35, 76 and 77. The resistors 71, 73 are disconnected from and the resistors 72, 74 are connected into the circuit. Also, the voltage divider 31, 33 is replaced by the voltage divider 32,34. In this way, the apparatus takes into consideration the sensitivity and the Schwarzschild exponents of printing paper for each of the extreme colors yellow and blue.

In the next-following step, the operator presses the starter button 15 to begin the exposure to blue light (filter 29) so that the pilot lamp 11 lights up. When the output current of the operational amplifier 37 through the resistor 44 reaches a negative value which equals that of the reference current flowing through the resistor 48, the device 46 causes the associated electromagnet to remove the blue filter 29 and to close the shutter 27. At the same time, the aforementioned relay actuates the switches 35, 76 and 77.

Depending on the type of light source, the exposure to the other (yellow) color can begin immediately following withdrawal of the blue filter 29 or with a short delay which is required to carry out the interchange of filters. The control unit 42 comprises or controls conventional means for interrupting or preventing any changes in voltage at the output of the operational amplifier 37 during the exchange of filters. When the exposure is to be resumed (to yellow light), the voltage at the output of the amplifier 37 changes again and the electromagnets which move the yellow filter 28 into the path of light and open the shutter 27 are energized. The exposure to yellow light is terminated when the current flow at the input of the current comparing device 45 decreases to zero. The electromagnets are then deenergized so that the shutter 27 closes and terminates the exposure.

In order to enable the printer to utilize different types of printing paper (e.g., for print toning or screen technique) without changing the adjustment of calibrating potentiometers 31, 32 and variable resistors 71–74, the apparatus preferably comprises two or more sets of such potentiometers and variable resistors. The selector switch 14 of FIG. 1 can be actuated to connect the appropriate set into the circuit of FIG. 4 at the will of the operator, i.e., depending on the type of paper which is employed in the printer. The position of the filter disk 17*a* in the lamp housing 1*a* is changed simultaneously with actuation of the switch 14 to place the other grey filter into the path of light which issues from the lamp 25. This is advisable in order to select the intensity of printing light in dependency on the type of printing paper. For example, when operating with a color screen, the intensity of light should be much higher than for copying of half-tone negatives.

The mechanical construction of the exposure control apparatus can be simplified by fixedly mounting the density scale 6 in the housing 1. The knob 5 is then used to select the total exposure time in accordance with the previously determined maximum and minimum opacities of the negative and the knob 4 is used to determine the duration of exposures to blue and yellow light by simultaneously moving the contact arm 20*a* of the potentiometer 20 and by turning the drum 23 with the calibration curve 8 to a position in which the curve 8 pinpoints that graduation of the scale 6 which indicates the density range of the negative, namely, the difference between the maximum and minimum densities. The graduations of scale 6 then indicate successive values of the density range which may increase linearly in a direction from the left to the right, as viewed in FIG. 1 or 2. Such graduations can be applied to a standardized sheet in accordance with the previously described procedure. The manipulation of the just described apparatus is somewhat more complicated because it is necessary to determine not only the maximum and minimum densities of a negative but also the difference between such extreme densities prior to manipulation of the exposure time selecting knob 5.

Figure 5:
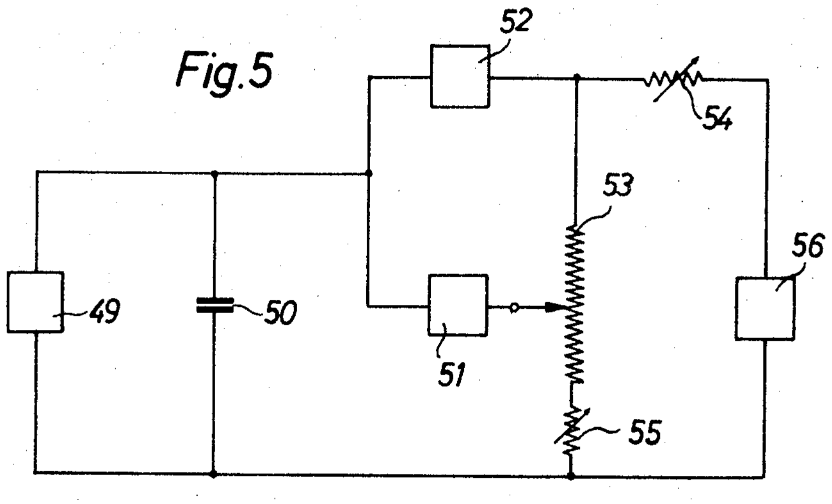
FIG. 5 illustrates a portion of a modified circuit.

FIG. 5 illustrates a modified electric circuit which can replace the circuit of FIG. 4. The numeral 49 denotes a source of electrical energy which is employed to charge a capacitor 50. The charge of this capacitor 50 is measured by two scanning circuits 51, 52. The range of output signals produced by circuits 51, 52 can be adjusted by three potentiometers 53, 54, 55. The scanning circuit 52 is connected with a source 56 of reference potential by way of potentiometer 54 which latter is adjustable to account for the sensitivity of printing paper. The scanning circuit 51 receives only a portion of reference potential by way of the potentiometer 53 which constitutes a voltage divider. The potentiometer 55 is in series with potentiometer 53 and is employed to take into account different sensitivites of printing paper to light in the extreme colors blue and yellow as well as to take into consideration different densities of light which is transmitted to the negative by the light source. The potentiometer 55 replaces the potentiometers 31, 32 of FIG. 4. The potentiometers 31, 32 or 55 can be used in addition to or as a substitute for grey filters which may be used in conjunction with color filters 28, 29 in order to bring about coarse adjustment of light density at the negative or such adjustment of density that the darkening of printing paper per unit of time is the same during exposure in either one of the two extreme colors. The potentiometer 53 determines the ratio of exposure times in blue and yellow light. A further potentiometer in the energy source 49 is adjustable to determine the slope of the curve which indicates the rise of potential between the plates of capacitor 50 as a function of the maximum density of the negative. Otherwise, the circuit of FIG. 5 operates in the same way as the circuit of FIG. 4.

Figure 6:
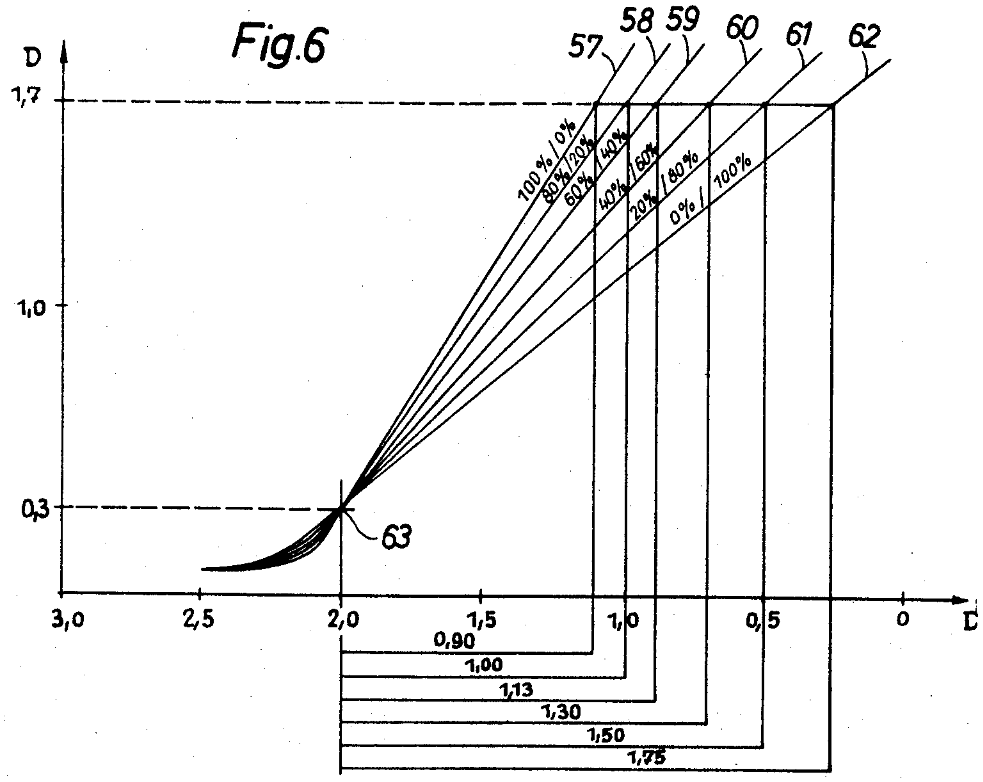
FIG. 6 is a graph showing certain steps in determination of the calibration curve.

FIG. 6 illustrates the mode of graphically determining the calibration curve 8. The density D of the negative is measured along the abscissa, such density corresponding to the logarithm of I.*t* wherein I is the intensity of illumination and *t* is the exposure time. The density D of the print is measured along the ordinate. The exposure time is selected in such a way that the density of the print is in a medium density range. The numerals 57 to 62 indicate a bundle of darkening curves measured on prints taken with grey filters with different ratios of blue and yellow light. The two outer curves 57, 62 respectively indicate illumination exclusively with yellow and blue light. During calibration with potentiometers 31, 32 on the basis of shots taken with grey wedges in pure yellow and blue light, the curves 57 and 62 are displaced in such a way that they intersect each other at or close to the point 63. This point corresponds to a print density of 0.3 and is determined by the original illumination and by calibration for a number 2 density of negative. It can be readily proven by calculation that the calibration can bring about parallel displacement of curves 57–62 in twice the logarithmic ratio and that it also applies for other I.*t* values which deviate from the negative density value of 2.0. The curves 58–61 indicate a series of changes in the ratio of blue and yellow light, always by 20 percent. Each of these curves intersects a different portion of a horizontal line which intersects the paper density value 1.7 on the ordinate.

Figure 7:
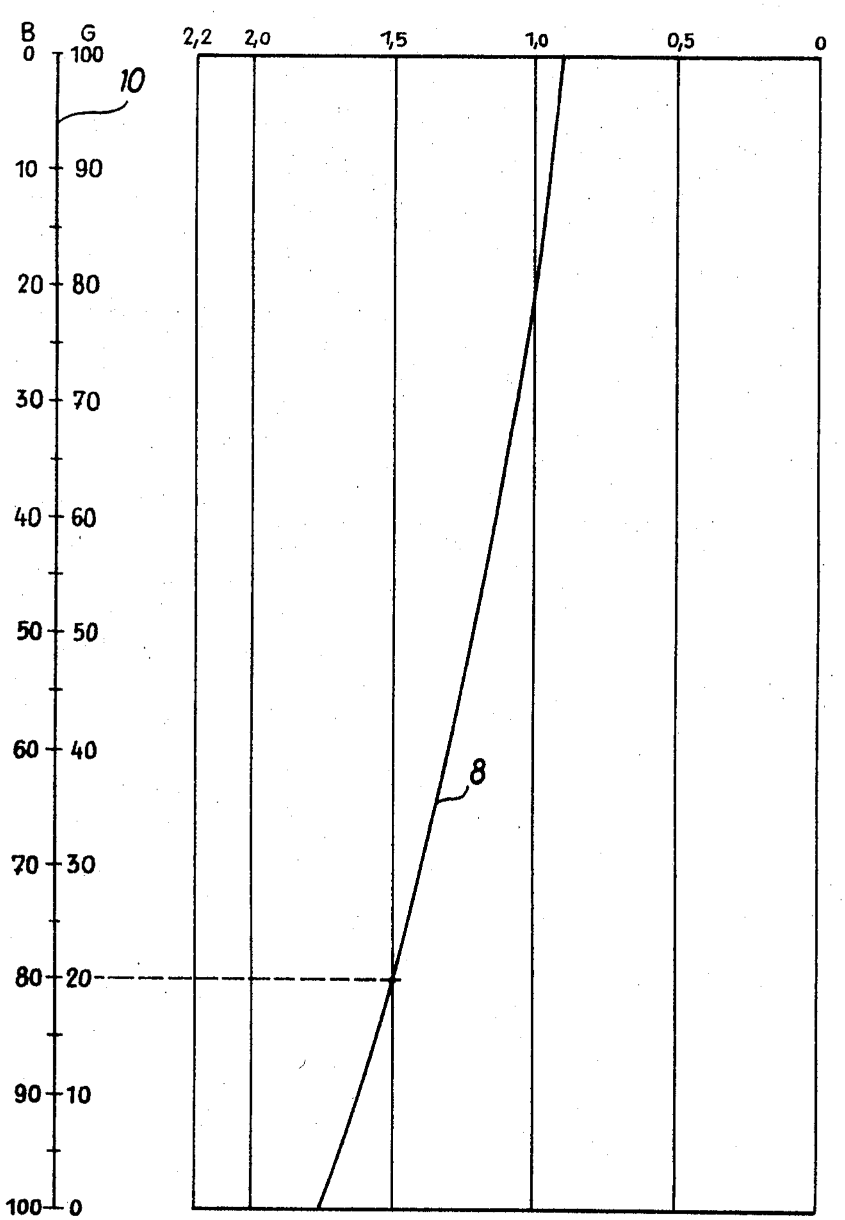
FIG. 7 illustrates a calibration curve which is determined on the basis of the graph shown in FIG. 6.

The curve 8 of FIG. 2 can be obtained in accordance with FIG. 7 by plotting the values indicating the ratio of individual exposures (curves 57–62) on a chart indicating the density range of the negative, for example, in the density range of 0.3 to 1.7. FIG. 7 shows a curve 8 which indicates that, at a ratio of 40 percent blue light to 60 percent yellow light, the density range of the negative must be 1.13 in order to obtain a desired density range of 1.4 in the print. If the ratio of blue light to yellow light is 80 to 20 percent, the density range of the negative should be 1.5. On the basis of the curve 8, appropriate adjustment of the knob 4 can select any one of a number of intermediate values without further calculations.

Figure 8:
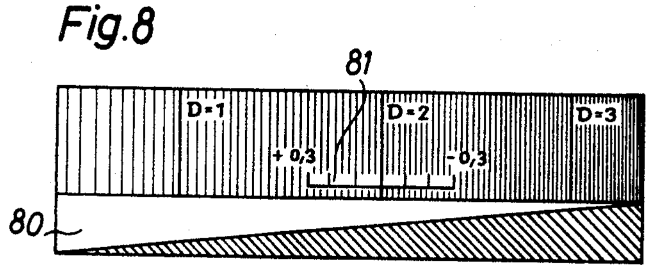
FIG. 8 illustrates a wedge which is utilized in making of test strips.

In actual practice, the apparatus is preferably calibrated by resorting to a calibrating wedge. The constant of the wedge equals the constant of the scale 6, i.e., D=0.2 cm. In order to simplify the calibrating operation, the wedge is preferably provided with a small auxiliary scale which is printed onto the material which is exposed to light during calibration. FIG. 8 shows a calibrating wedge 80 which is provided with an auxiliary scale 81. The range of graduations on the scale 81 is from +0.3 to −0.3 and the zero value coincides with the density value 2 of the wedge. The knob 5 is manipulated to place the graduation 2 on the density scale 6 into registry with the index 24. In order to expose a first test strip, the knob 4 is adjusted first for exposure to yellow light alone and thereupon for exposure of a second test strip to blue light. A densitometer is then employed to determine the position of the point corresponding to desired minimum density (for example, 0.3) on each of the thus exposed test strips. If the position of such point coincides with the graduation 0 of the auxiliary scale 81, the calibration of the apparatus for sensitivity is accurate. However, if the thus determined points coincide with a positive or negative graduation of the auxiliary scale, the corresponding calibrating potentiometer 31 or 32 must be adjusted in accordance with the thus determined value. To this end, the potentiometers 31, 32 are provided with scales having graduations from +0.3 to −0.3 whereby the zero graduation corresponds to the central position of the respective contact arm.

The calibration can also be carried out in such a way that the curves 57–62 of both grey filters intersect each other on the line passing through the graduation 1.7 on the ordinate. It is further clear that the range +0.3 to −0.3 of graduations on the auxiliary scale 81 and the value 2 for the maximum density are given solely by way of example.

The exposure control apparatus can also be used in combination with an enlarger. The lamp housing 1*a* of FIG. 3 is then replaced by a box which is placed in the path of light in an enlarger and contains only the color filters 28, 29 and shutter 27. The mirror 30 is omitted and the lamp 25 is replaced by the light source of the enlarger. The function of the grey filter 27*a* is performed by the diaphragm in the enlarger. When the rate of magnification is changed, the diaphragm is adjusted to maintain the intensity of light at a substantially unchanged value.

If the apparatus is used in combination with a repro camera having a motor-driven rotary filter disk and which can contain a number of filters, an adapter must be connected between the camera and the exposure control apparatus in order to convert the signals produced by apparatus for direct control of electromagnets which move the shutter 27 and filters 28, 29 into appropriate electrical impulses serving to regulate rotation of the filter disk and to insert selected filters into the path of light in the camera.

It is further clear that the apparatus is not limited to a control of the exposure of printing material whose gradation is different for blue and yellow light. For example, the apparatus can control exposure of printing material in blue and red light. Thus exposed materials can be processed under identical circumstances regarding the duration of developing step and the temperature, type and concentration of developing solution. Very satisfactory results are achieved if the test strips and the exposed printing material are developed in accordance with "gamma-infinity", namely, if they are developed for such periods of time that the developing solution ceases to cause further darkening. Such method of developing can be carried out by semiskilled persons without resorting to expensive automatic processing machines.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A method of controlling exposure during the photographic printing of variable-contrast printing material which is exposed to printing light passing in two colors through a negative having one of a plurality of negative density ranges so as to produce on said printing material a print having predetermined minimum and maximum densities defining a positive density range, comprising the steps of photoelectrically measuring the maximum and minimum negative density values of the negative to determine its negative density range; selecting the total exposure time — which is the sum of the specific exposure times in each of said colors — as a function of one of said negative density values so that the positive density value of the print upon exposure of said printing material to light in said colors is within said positive density range; storing a plurality of calibrated values of the ratios of said specific exposure times in said colors for each of said plurality of negative density ranges whereby each of said negative density ranges corresponds to a different positive density range of the print; selecting the ratio of specific exposure times in said colors within said total exposure time from said stored calibrated values for achieving a desired positive density range of the print; and exposing the printing material accordingly.

2. A method as defined in claim 1, wherein said calibrated values are stored in the form of a calibration curve and said step of selecting the ratio of specific exposure times in said colors comprises changing the position of said calibration curve.

3. A method as defined in claim 1, wherein said total exposure time is an antilog function of said one negative density value.

4. A method as defined in claim 1, wherein said total exposure time is further a function of the Schwarzschild exponent of said printing material for each of said colors.

5. A method as defined in claim 1, wherein the intensity of printing light is selected in such a way that the darkening of printing material per unit of time is substantially the same during exposure to each of said colors.

6. A method as defined in claim 1, comprising the additional step of developing the thus exposed printing material in accordance with the gamma infinity process.

7. A method as defined in claim 1, wherein said colors are yellow and blue.

8. A method of determining exposure time for photographic printing of variable-contrast printing material which is exposed to light passing through a negative in two colors and whose gradation is different for each of said colors, comprising the steps of photoelectrically measuring the minimum and maximum density values of the negative to determine its density range; selecting the total exposure time to light in said colors as an antilog function of one of said density values and by separately considering the sensitivity of printing material in each of said colors; determining a calibration curve which is indicative of the optimum relationship between selected density ranges of negatives and the ratio of the two colors, including repeatedly exposing a stepped grey filter with different ratios of light in said colors onto samples of said printing material, developing said samples to form on the developed samples a set of darkening curves each indicative of a different ratio of light in said colors, and plotting the values indicating such ratios on a chart indicating the density range of the negative to thus obtain said calibration curve; and selecting the ratio of exposures to light in said colors within said total exposure time by way of said calibration curve for achieving a predetermined density range of the print and exposing the printing material accordingly.

* * * * *